United States Patent
Vedam et al.

(10) Patent No.: US 11,762,345 B2
(45) Date of Patent: *Sep. 19, 2023

(54) PROCESS OPTIMIZATION BY GROUPING MIXED INTEGER NONLINEAR PROGRAMMING CONSTRAINTS

(71) Applicant: AVEVA SOFTWARE, LLC, Lake Forest, CA (US)

(72) Inventors: Rajkumar Vedam, Katy, TX (US); James Jude Kattapuram, Trabuco Canyon, CA (US); Kishore Kumar Hemachandran, Chennai (IN); Sankararao Boddupalli, Hyderabad (IN); Pranav Bhaswanth Madabhushi, Telangana (IN); Gareth Hillier, Houston, TX (US); Mallikarjun Avanna Lavate, New Town Bangalore (IN); Detong Zhang, Houston, TX (US); Purt Tanartkit, Yorba Linda, CA (US)

(73) Assignee: AVEVA SOFTWARE, LLC, Lake Forest, CA (US)

( * ) Notice: Subject to any disclaimer, the term of this patent is extended or adjusted under 35 U.S.C. 154(b) by 54 days.

This patent is subject to a terminal disclaimer.

(21) Appl. No.: 17/374,291

(22) Filed: Jul. 13, 2021

(65) Prior Publication Data
US 2022/0004153 A1    Jan. 6, 2022

Related U.S. Application Data

(63) Continuation of application No. 16/411,752, filed on May 14, 2019, now Pat. No. 11,099,528, which is a continuation of application No. 14/977,785, filed on Dec. 22, 2015, now Pat. No. 10,310,458.

(51) Int. Cl.
*G05B 13/04*    (2006.01)
*G06F 17/11*    (2006.01)

(52) U.S. Cl.
CPC ............ *G05B 13/041* (2013.01); *G06F 17/11* (2013.01); *F23N 2223/40* (2020.01); *F23N 2223/44* (2020.01); *H02J 2203/20* (2020.01)

(58) Field of Classification Search
CPC ... G05B 13/041; G06F 17/11; F23N 2023/40; F23N 2023/44; H02J 2003/007
See application file for complete search history.

(56) References Cited

U.S. PATENT DOCUMENTS

| | | | |
|---|---|---|---|
| 7,599,750 | B2 | 10/2009 | Piche |
| 8,447,423 | B2 | 5/2013 | Budiman et al. |
| 8,515,582 | B2 | 8/2013 | Jia et al. |
| 8,527,590 | B2 | 9/2013 | Tapolcai et al. |
| 10,310,458 | B2 * | 6/2019 | Vedam .................. G06F 17/11 |
| 10,908,563 | B2 | 2/2021 | Vedam et al. |
| 11,099,528 | B2 * | 8/2021 | Vedam ................. G05B 13/041 |

(Continued)

*Primary Examiner* — Crystal J Barnes-Bullock
(74) *Attorney, Agent, or Firm* — Greenberg Traurig, LLP

(57) ABSTRACT

Real-time dynamic optimization of a process model in an online model-based process control computing environment. A mixed integer nonlinear programming (MINLP) solver utilizes grouping of first-principle model units to implement constraints of the underlying process. A group identifier parameter and a group complement parameter enable the grouping behavior through association with the first-principles model units.

20 Claims, 11 Drawing Sheets

(56) References Cited

U.S. PATENT DOCUMENTS

2016/0370772 A1    12/2016  Tanartkit et al.
2017/0192397 A1     7/2017  Vedam et al.
2020/0233385 A1*    7/2020  Tanartkit ................. G06F 17/11
2023/0025522 A1*    1/2023  Tanartkit ................. G06F 30/20

* cited by examiner

FIG. 3A

PROCESS OPTIMIZATION BY GROUPING MIXED INTEGER NONLINEAR PROGRAMMING CONSTRAINTS

CROSS-REFERENCE TO RELATED APPLICATIONS

This application is a continuation of U.S. patent application Ser. No. 16/411,752, filed May 14, 2019, which is a continuation of U.S. patent application Ser. No. 14/977,785, filed Dec. 22, 2015, now U.S. Pat. No. 10,310,458, issued Jun. 4, 2019, all of which are hereby incorporated by reference in their entirety for all purposes.

BACKGROUND

Conventional tools for continuous process optimization employ calculations designed to determine optimal operating states of continuous processes, such as refinery, chemical, or petrochemical plant operations. When an optimal decision requires the switching on or switching off of units, conventional systems and methods for continuous optimization utilize a Mixed Integer Nonlinear Programming (MINLP) solver and unit models that simulate the switching behavior of the desired process units. The MINLP solvers implemented by conventional systems and methods look for optimal solutions in all possible regions, which is complex and time-consuming. Moreover, conventional systems and methods that utilize computing devices to implement MINLP solvers are not optimized to efficiently use the processors and/or memory of the computing devices.

SimSci ROMeo, available from Schneider Electric, is a Rigorous On-line Modeling and Equation-based Optimization (ROMEO) module for continuous process optimization.

SUMMARY

Aspects of the present invention improve the fields of process control and automation and process simulation by employing online first-principles simulation techniques in conjunction with a Mixed Integer Nonlinear Programming (MINLP) solver in real-time. Grouping of units that comprise a process model as a mechanism to implement constraints for MINLP utility optimization provide optimization of nonlinear continuous processes that incorporate switchable units. In an aspect, this approach allows the determination of an optimal operating state while taking into account changing process parameters without requiring case studies that model switchable units to be taken offline. Aspects of the present invention also provide improvements in computer technology, namely, process model simulation and optimization.

In an aspect, a system includes a sensor and a control system. The sensor generates data representing a current state of each of a plurality of process units within a continuous process. The control system receives the generated data and generates an operating state of the continuous process. The control system includes a processor that executes computer-executable components. One of the computer-executable components includes a plurality of model components that implement a first-principle equation. The first-principle equation represents at least one of the process units and two or more of the model components comprise a group. Another of the computer-executable components includes a plurality of switch components that each comprises a corresponding one of the plurality of model components. The switch components each implement an MINLP behavior of the corresponding model component. Each of the switch components also includes a group identifier parameter of the group and a group complement parameter that encodes an operational constraint of the continuous process. Another of the computer-executable components includes an MINLP solver component that switches each of the model components of the group between an active state and an inactive state based in part on the group identifier parameter and the group complement parameter during a simulation of an operation of the plurality of model components. The MINLP solver component performs the switching during the simulation to generate the operating state of the continuous process in real-time with an operation of the continuous process.

In another aspect, a computer-implemented method for generating an optimal operating state of a continuous process includes receiving, by a control system, data from a sensor within the continuous process. The data represents a current state of each of a plurality of process units within the continuous process. The method also includes simulating, by the control system, an operation of a plurality of unit models in conjunction with an MINLP solver in real-time. The unit models each represent one of the process units via a first-principle equation. The method further includes grouping, by the control system, two or more of the unit models into a group based on an operating constraint of the continuous process. Each of the unit models of the group have an MINLP switch that implements MINLP behavior of the unit model and encodes the operating constraint. The method continues with the control system switching the MINLP switch of each unit model of the group between an active state and an inactive state during the simulation based in part on the operating constraint. The control system also generates an operating state of the continuous process that satisfies the operating constraint based on the simulating, grouping, and switching.

In yet another aspect, a computer-readable storage device has computer-executable modules stored thereon for generating an operating state of a continuous process. The modules include a plurality of model modules, a plurality of MINLP switch modules, and a solver module. The model modules each define a plurality of unit models that represent a process unit within the continuous process via a first-principle equation during an execution of the model module by a processor. Two or more of the model modules comprise a group. The MINLP switch modules each transition a corresponding model module of the group between an active state and an inactive state based on a parameter that encodes an operating constraint of the continuous process during an execution of the MINLP switch module by the processor. The MINLP switch modules each implement an MINLP behavior of the corresponding model module. The solver module simulates an operation of the model modules and the MINLP switch modules in real-time during an execution of the solver module by the processor. The solver module generates the operating state of the continuous process where the operating state satisfies the parameter encoding the operating constraint of the continuous process.

Other objects and features will be in part apparent and in part pointed out hereinafter.

BRIEF DESCRIPTION OF THE DRAWINGS

FIGS. 3A and 3B are diagrams illustrating an exemplary graphical user interface of MINLP switch configuration parameters.

Corresponding reference characters indicate corresponding parts throughout the drawings.

DETAILED DESCRIPTION

Figure 1:
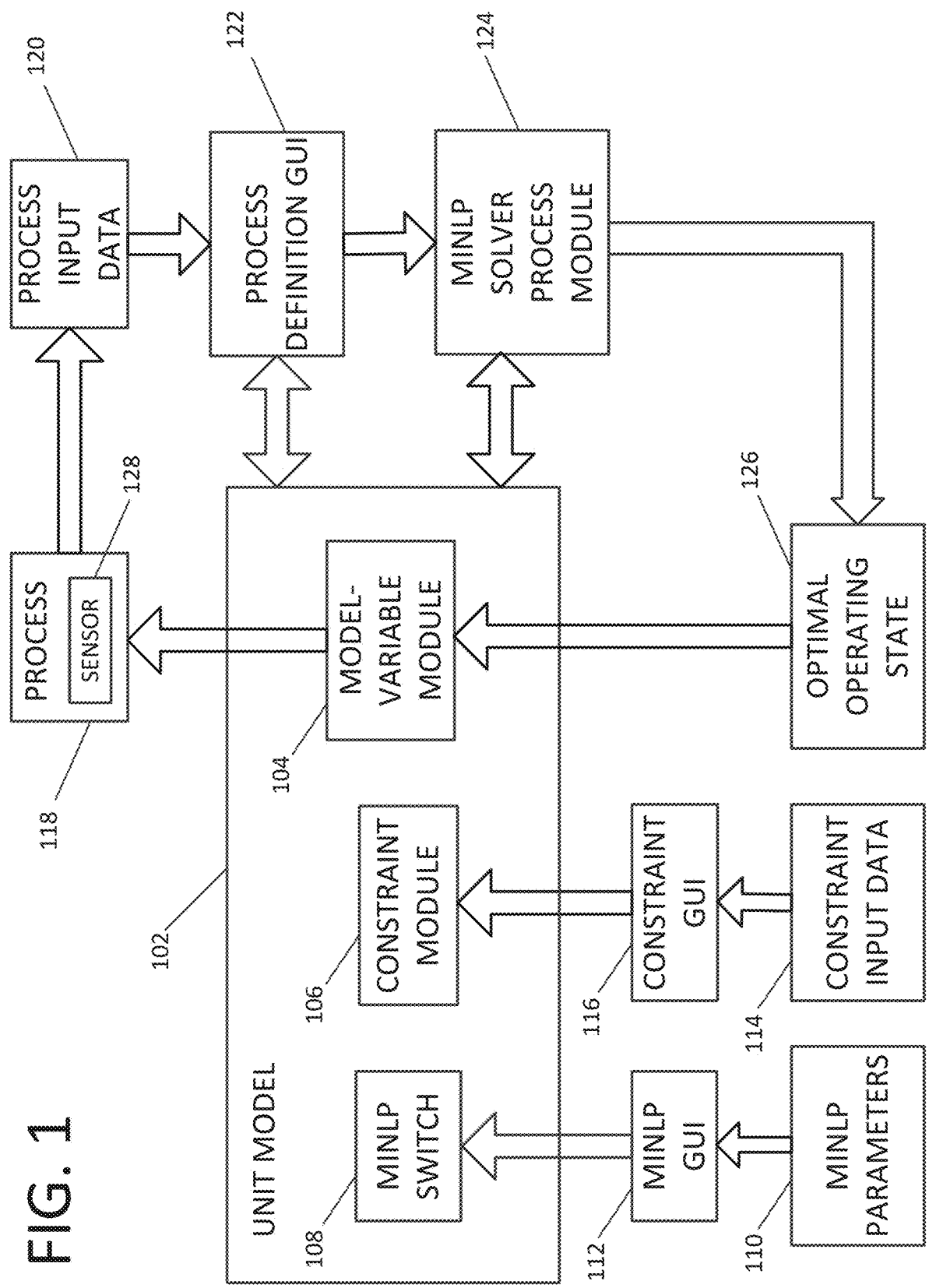
FIG. 1 is a block diagram of an exemplary ROMEO solver system embodying aspects of the invention.

Referring now to the drawings, FIG. 1 is a block diagram of a ROMEO™ modeling software solver system embodying aspects of the invention, including implementing Mixed Integer Nonlinear Programming (MINLP) behavior. In one form, computer-executable instructions are executed to solve a process problem by an MINLP switch in conjunction with constraints of a model that can simulate the behavior of desired process units. The illustrated system includes a unit model module 102, a model-variable module 104, a constraint module 106, an MINLP switch 108, MINLP parameters 110, an MINLP interface 112, constraint input data 114, a constraint interface 116, a process 118, process input data 120, a process definition interface 122, a solver module 124, an optimal operating state 126, and a sensor 128. In an embodiment, FIG. 1 illustrates an MINLP modeling system and method. However, non-invasive MINLP modeling systems and methods, as described in U.S. patent application Ser. No. 14/745,961, filed Jun. 22, 2015, and hereby incorporated by reference in its entirety, may also be utilized with aspects of the present invention.

Systems and methods described herein solve nonlinear process problems while optimizing for certain considerations (e.g., operating penalty, cost, etc.) while ensuring the process meets plant constraints. Aspects of the present invention are described herein with respect to optimizing energy source usage in a continuous process but it is to be understood by one skilled in the art that the systems and methods described herein are also capable of optimizing continuous processes with respect to considerations other than energy source usage.

Energy source (e.g., utility) optimization in continuous processes involves calculating the best solution to meet the energy demand, while operating the underlying process optimally with desired operational specifications and keeping the operational expenses as low as possible. In order to perform a quantum of work in a process, there is a need for some amount of energy. The utility optimization problem is relevant when there are multiple energy sources that can supply the desired quantum of energy. For example, there may be some sources of energy endemic to the process and other sources of energy that are extraneous to the process. Utility optimization requires the capability to switch among available energy sources depending on the economics, energy and material balance, and underlying nonlinear process optimality. These computational issues require an MINLP solver in conjunction with models that can simulate the switching behavior of process units. While modeling the process for MINLP, it is advantageous to encode operational constraints of the process or plant into the model. Such constraints simplify the task for the MINLP solver by focusing the search for a solution in only the feasible regions.

Grouping of units that comprise a process model as a mechanism to implement constraints for MINLP utility optimization is the subject of aspects of the present invention.

The utility optimization problem solved by aspects of the present invention can be expressed in general mathematical form. Consider a nonlinear process modeled with equality constraints $f(x,y,z)=0$, where the function f is nonlinear in the vector variables x, y, and z. Let $f: R^N \times R^S \times B^B \rightarrow R^N$, illustrating the dimension of these quantities, where typically, $S<N$. The variables of vector x are free-dependent and can be varied between some operational bounds of the process (e.g., of dimension $N \times 1$). The variables of vector y are free-independent variables and usually referred to as a "specification" and also varied between bounds of the process (e.g., of dimension $S \times 1$). In an embodiment, $S<N$. The variables of vector z are free-independent and z is the vector of integer switches in the problem. In an embodiment, variables in vector z vary between [0, 1] and is of dimension $B \times 1$. Given a cost function $c(x,y,z)$, the utility optimization problem, assuming minimization of cost, is:

$$\min_{x,y,z} c(x, y, z) \qquad \text{(Equation 1)}$$

subject to $$f(x, y, z) = 0$$

and $$x_{min} \leq x \leq x_{max}, y_{min} \leq y \leq y_{max}, \text{ and } z \in B^B$$

A Rigorous Online Modeling and Equation-based Optimization (ROMEO) modeling system, as described herein, allows a user to construct a flowsheet of the process with models or units from a pre-built library or from models built by the user. These models encode the quantities f, c, x, and y in Equation 1. Aspects of the present invention described herein encompass the incorporation of plant operation constraints that specify some special structure to binary variable switching. For example, such constraints would add variables to vectors x and z, add functions to f, and add terms to c. Aspects of the present invention described herein also encompass the specification of the constraints as well as the mathematical encoding of the constraints to the model.

Referring further to FIG. 1, in an embodiment, the unit model module 102 (i.e., unit) comprises a storage memory device having stored thereon processor-executable instructions for defining a first-principle model of a unit comprising a continuous process that has been modified to implement MINLP behavior. In an exemplary embodiment, unit 102 defines a first-principle model of a motor in the process 118 and includes the model-variable module 104, the constraint module 106, and the MINLP switch 108. Additional units include, but are not limited to, generators, steam turbines, boiler fuel flows, motors, shafts, and the like. Additional details of unit 102 are further described herein and in U.S. patent application Ser. No. 14/745,961 incorporated by reference above.

Still referring to FIG. 1, the model-variable module 104 comprises, in an embodiment, a storage memory device having stored thereon process-executable instructions for defining a model-variable of the first-principle model of unit 102. In an exemplary embodiment, model-variable module 104 defines the shaft power of a motor as the model-variable of interest. Other model-variables include, but are not limited to, the shaft power of a generator, the actual work of a steam turbine, and flow rate of boiler fuel flows. Additional details of model-variable module 104 are further described herein and in U.S. patent application Ser. No. 14/745,961 incorporated by reference above.

In one embodiment of the present invention, the constraint module 106 comprises a storage memory device having stored thereon processor-executable instructions for defining one or more constraints of the first-principle model of unit 102. In an exemplary embodiment, constraint module 106 defines a minimum value (e.g., 0) and a maximum value (e.g., 100) of the shaft power of a motor.

In a further embodiment, operation of a continuous process, such as those employed at industrial plants, involves several constraints based on factors such as capacity, safety, economics, and the like. For example, due to bus-bar current loading limits, there might be a constraint that either one of two motors connected to the same bus-bars can operate at a time. Similarly, constraints may exist regarding switching in either a motor or a steam turbine to meet a given load, but not both simultaneously. Additionally, there may be constraints that specify a group of units should operate simultaneously if required by the load demands and the units by themselves cannot meet the demand. In an exemplary general case, there may be a need to encode more complex operational constraints. Aspects of the present invention as further described herein provide solutions to these situations by specifying and encoding operational constraints (e.g., of a plant) through grouping of model units. In an embodiment, grouping is a specification of a set of units that should be constrained to behave in a certain manner, as further described herein.

The MINLP switch 108 of FIG. 1 comprises a storage memory device having stored thereon processor-executable instructions for implementing MINLP behavior in the first-principle model of unit 102, in an exemplary embodiment. For example, MINLP switch 108 may implement MINLP behavior in a motor model defined by unit 102 by modifying the shaft power of the motor. In an embodiment, a unit 102 including MINLP switch 108 is referred to as an MINLP unit 102. Additional details of MINLP switch 108 are further described herein and in U.S. patent application Ser. No. 14/745,961 incorporated by reference above. In accordance with aspects of the invention, MINLP switch 108 may be referred to as a switch component in some embodiments.

Referring again to FIG. 1, the MINLP interface 112 receives MINLP parameters 110 from a source such as a user, another software program, or a device, for example. The MINLP interface 112 provides received MINLP parameters 110 to MINLP switch 108. The MINLP switch 108 uses the received MINLP parameters 110 to customize the MINLP behavior of the first-principle model of unit 102. In an exemplary embodiment, MINLP interface 112 is a graphical user interface (GUI) that allows a user to set a threshold for switching based upon parameters including a startup cost, a shutdown cost, and time period, as further described herein. Further details regarding MINLP interface 112 are described herein.

The constraint interface 116 of FIG. 1 receives constraint input data 114 from a source such as a user, another software program, or a device, for example. The constraint interface 116 provides the received constraint input data 114 to constraint module 106. The constraint module 106 uses the received constraint input data 114 to define the constraints of the first-principle model of unit 102. In an exemplary embodiment, constraint interface 116 is a GUI that allows a user to set constraints such as a minimum and maximum shaft power, for example, of a motor which unit 102 defines.

The constraint interface 116 and MINLP interface 112 may be combined into a single interface in accordance with aspects of the invention. Further details regarding constraint interface 116 are described herein.

According to embodiments of the invention, process 118 is a continuous process, such as a refinery, chemical, or petrochemical plant operation, for example, and/or its control system. In an embodiment, process 118 includes at least one sensor 128. Other aspects of process 118 are further defined herein. The process definition interface 122 receives process input data 120 from a source such as a user, another software program, or a device (e.g., a sensor and/or a unit in process 118), for example. The process input data 120 represents a current state of process 118 and corresponds to the process problem to be solved. The process definition interface 122 provides the received process input data 120 to the solver module 124 for use in executing an interactive model to solve the process problem as described herein. In an exemplary embodiment, process definition interface 122 is part of a ROMEO modeling system that allows a user to construct a flowsheet of process 118 with models or units from a pre-built library or from models built by the user.

The solver module 124 comprises a storage memory device having stored thereon processor-executable instructions for defining an iterative process having variables. The variables have certain values which, when applied to the iterative process, converge the iterative process to a solution. The variables have other values, which, when applied to the iterative process, do not converge the iterative process to a solution. In one form, solver module 124 comprises a ROMEO module. In another form, solver module 124 is an MINLP solver module. The solver module 124 is adapted for changing the value of a binary MINLP variable in order to switch unit 102 on and off in the simulation while converging to an optimal solution (e.g., optimal operating state 126) for the underlying nonlinear process 118. Commonly assigned U.S. patent application Ser. No. 13/968,119, which describes a nonlinear correction factor module for use with, for example, a ROMEO solver, is incorporated by reference in its entirety. Additional details regarding solver module 124 are further described in U.S. patent application Ser. No. 14/745,961 incorporated by reference above.

In an exemplary embodiment, at least unit model module 102 and solver module 124 comprise a control system adapted for transmitting control information to components (e.g., actuators) within process 118 and receiving sensory and feedback data from components (e.g., sensors) within process 118. For example, the control system and process 118 may communicate via a telecommunications network that facilitates the exchange of data, such as those that operate according to the IEEE 802.3 (e.g., Ethernet) and/or the IEEE 802.11 (e.g., Wi-Fi) protocols, for example. In another embodiment, the control system and process 118 communicate via any medium that allows data to be physically transferred through serial or parallel communication channels (e.g., copper wire, optical fiber, computer bus, wireless communication channel, etc.). In additional exemplary embodiments, the control system is one of a distributed control system (DCS) and a centralized database run in an online mode.

Figure 2:
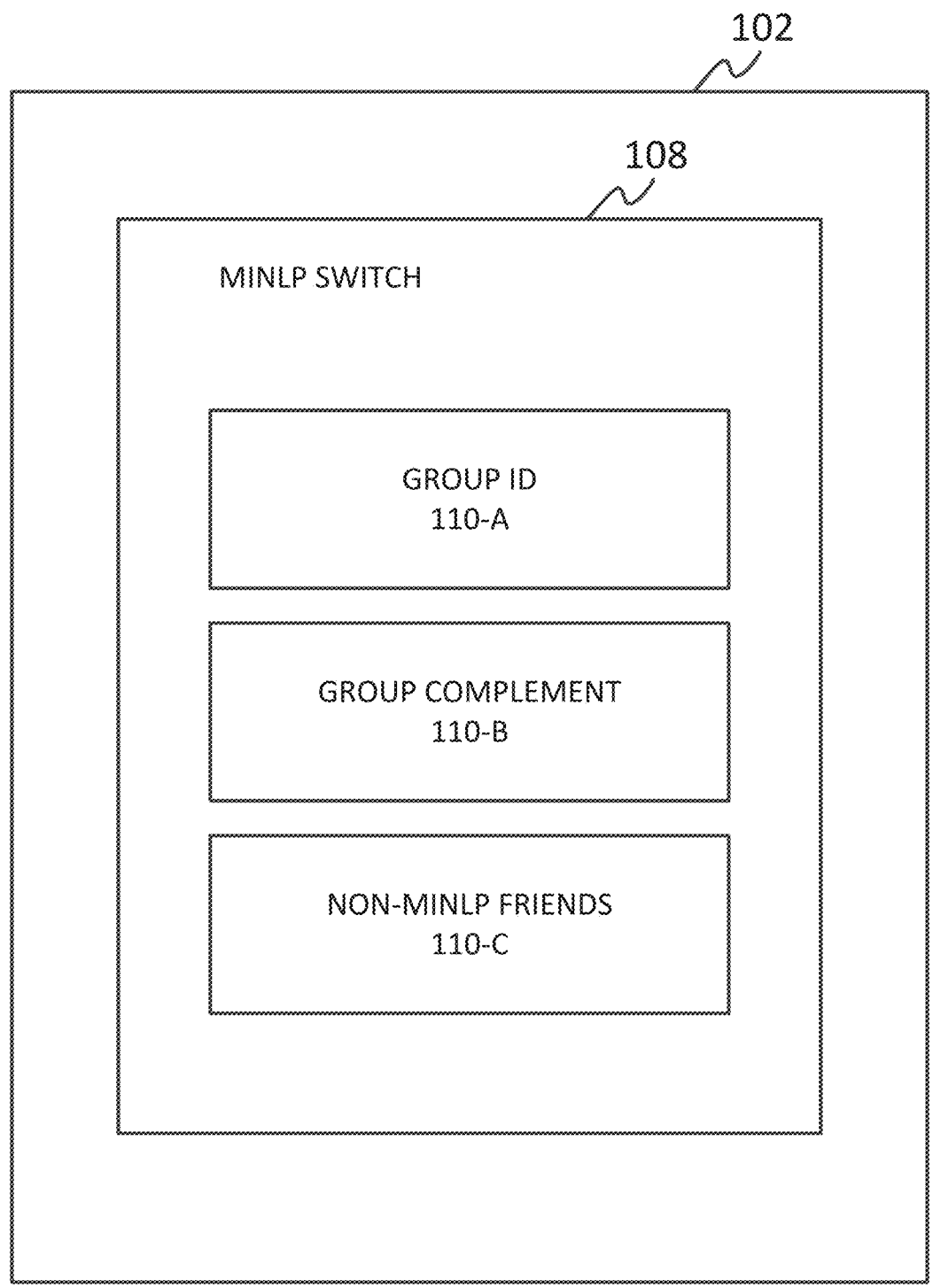
FIG. 2 is a block diagram on an exemplary MINLP switch embodying aspects of the invention.

FIG. 2 illustrates an exemplary embodiment of MINLP switch 108 that uses grouping as a mechanism to implement constraints for MINLP optimization. In this embodiment, MINLP switch 108 includes a group identifier parameter 110-A, a group complement parameter 110-B, and a friend parameter 110-C. The group identifier parameter 110-A identifies a group of MINLP units to which MINLP unit 102 including belongs. The group identifier 110-A may be edited via MINLP GUI 112 such that all MINLP units 102 with the same group identifier 110-A are members of the same group. In other words, if two MINLP units 102 are in a group, then they will share the same group identifier 110-A. In an embodiment, group identifier 110-A is a string of alphanumeric characters. The group complement 110-B indicates whether MINLP unit 102 switches in the same manner as other MINLP units with the same group identifier 110-A or complementary to other MINLP units with the same group identifier 110-A. In an embodiment, group complement parameter 110-B is a binary option, and can be marked by such indicators as "yes", or "active", or a checked checkbox on MINLP GUI 112. The group complement parameter 110-B may also be unmarked by such indicators as "no", "inactive", or an unchecked checkbox on MINLP GUI 112. For example, if group complement 110-B is marked, then the corresponding MINLP unit 102 will be switched on when other MINLP units of the group having their corresponding group complements unmarked are switched off. Likewise, if group complement 110-B is marked, then the corresponding MINLP unit 102 will be switched off when other MINLP units of the group having their group complements unmarked are switched on. In this manner, an MINLP unit 102 having its group complement 110-B marked will exhibit complementary behavior when compared to other MINLP units having the same group identifier 110-A and unmarked group complements. The friend parameter 110-C provides an association with non-MINLP units 102 that should behave in an identical manner as MINLP unit 102, as further described herein.

In an embodiment, various rules govern group behavior and the rules may be implemented singly, all together, or as a mix of various ones. One rule is that MINLP units 102 marked as belonging to the same group share a fundamental switching law. Another rule is that all MINLP units 102 in a group (e.g., having the same group identifier 110-A) switch on or off simultaneously, unless they are marked as complements (e.g., via group complement parameter 110-B). Yet another rule is that MINLP units 102 in a group marked as complement switch in opposition to the rest of the group. In other words, if the group members turn on, then the complement unit turns off, and vice-versa. Another rule is that each MINLP-aware unit 102 declares the group to which it belongs (e.g., via group identifier 110-A). Each MINLP-aware unit, when instantiated, also has a default group identifier 110-A that is unique to that unit. Moreover, a group cannot have a membership of zero, which is impossible by definition. As further described herein, a group can have membership across sub-flowsheet boundaries. By definition, a unit can belong to only one group (i.e., a unit cannot belong to more than one group at the same time). Group names, as further described herein, follow the naming convention of the associated ROMEO solver system.

Figure 3A:
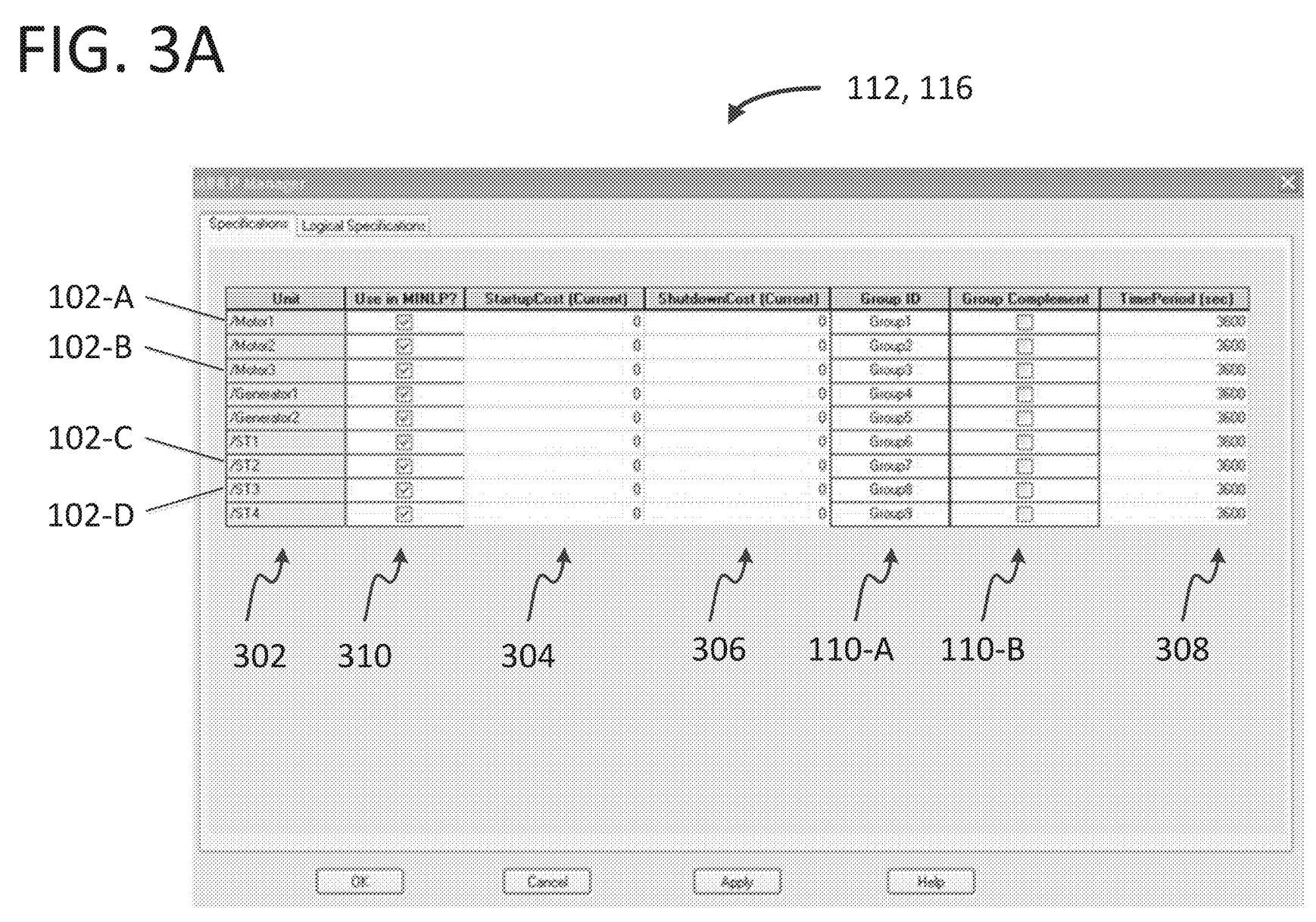
Figure 3B:
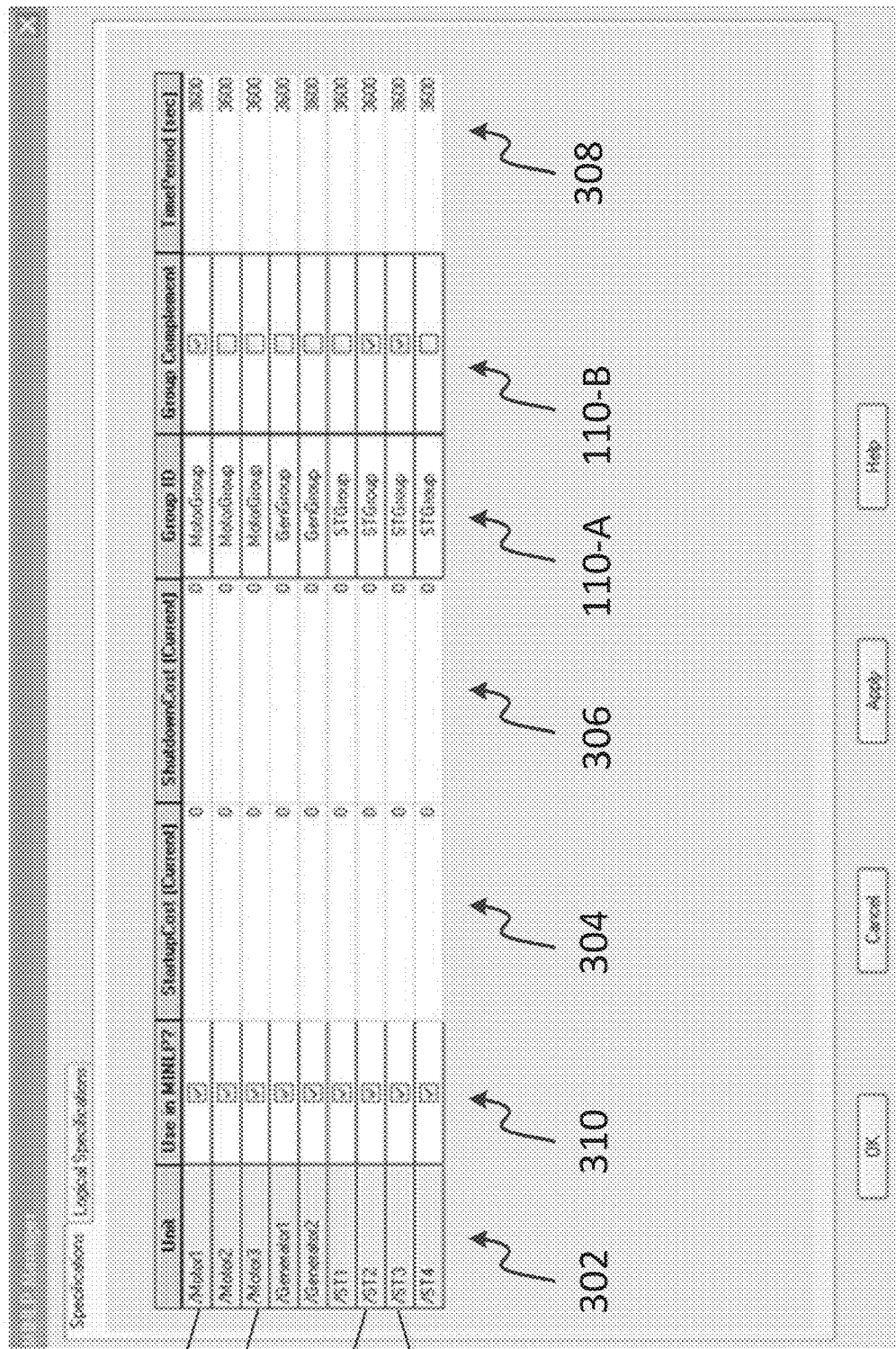

FIGS. 3A and 3B illustrate exemplary MINLP graphical user interfaces (GUI) 112 and constraint GUIs 116. A configuration window incorporating aspects of MINLP GUI 112 and constraint GUI 116 is illustrated. In an embodiment, the configuration window appears on a display device via invocation of a "MINLP Manager" feature associated with MINLP switch 108. The configuration window includes entries (e.g., 102-A, 102-B, 102-C, 102-D) in a table for every MINLP unit 102 on a flowsheet of process definition GUI 122. The configuration window also includes parameters (e.g., MINLP parameters 110 and constraint input data 114) associated with each unit 102. For example, a unit identifier 302, MINLP flag 310, constraints 304, 306, 308, group identifier parameter 110-A, and group complement parameter 110-B. The configuration window facilitates a user in editing the various parameters. Referring further to FIG. 3A, each MINLP unit 102 has a default group identifier 110-A that is unique to each MINLP unit 102. For example, MINLP unit 102-A has group identifier 110-A "Group1" while MINLP unit 102-B has group identifier 110-A "Group2," MINLP unit 102-C has group identifier 110-A "Group7," and MINLP unit 102-D has group identifier 110-A "Group8." Moreover, each of the MINLP units 102 illustrated in FIG. 3A have their group complement parameter 110-B unmarked (e.g., checkbox unchecked). In contrast, FIG. 3B illustrates customization of MINLP units 102. For example, MINLP unit 102-A has group identifier 110-A "MotorGroup" and has its group complement parameter 110-B marked (e.g., checkbox checked). MINLP unit 102-B has group identifier 110-A "MotorGroup" and its group complement parameter 110-B unmarked. Thus, MINLP units 102-A and 102-B are members of the same group (e.g., "MotorGroup") and MINLP unit 102-A switches complementarily with respect to the other units of the group (e.g., MINLP unit 102-B). In other words, when MINLP unit 102-A turns on, the simultaneously, MINLP unit 102-B turns off, and vice-versa. Moreover, each of MINLP units 102-C and 102-D are members of the same group by virtue of their group identifiers 110-A being identical (e.g., "STGroup") and exhibit complementary behavior relative to the other units of the group by virtue of their group complement parameters 110-B being marked. In other words, when MINLP units 102-C and 102-D turn off, then the other units of group (e.g., "ST1" and "ST4") turn on, and vice-versa.

Figure 4:
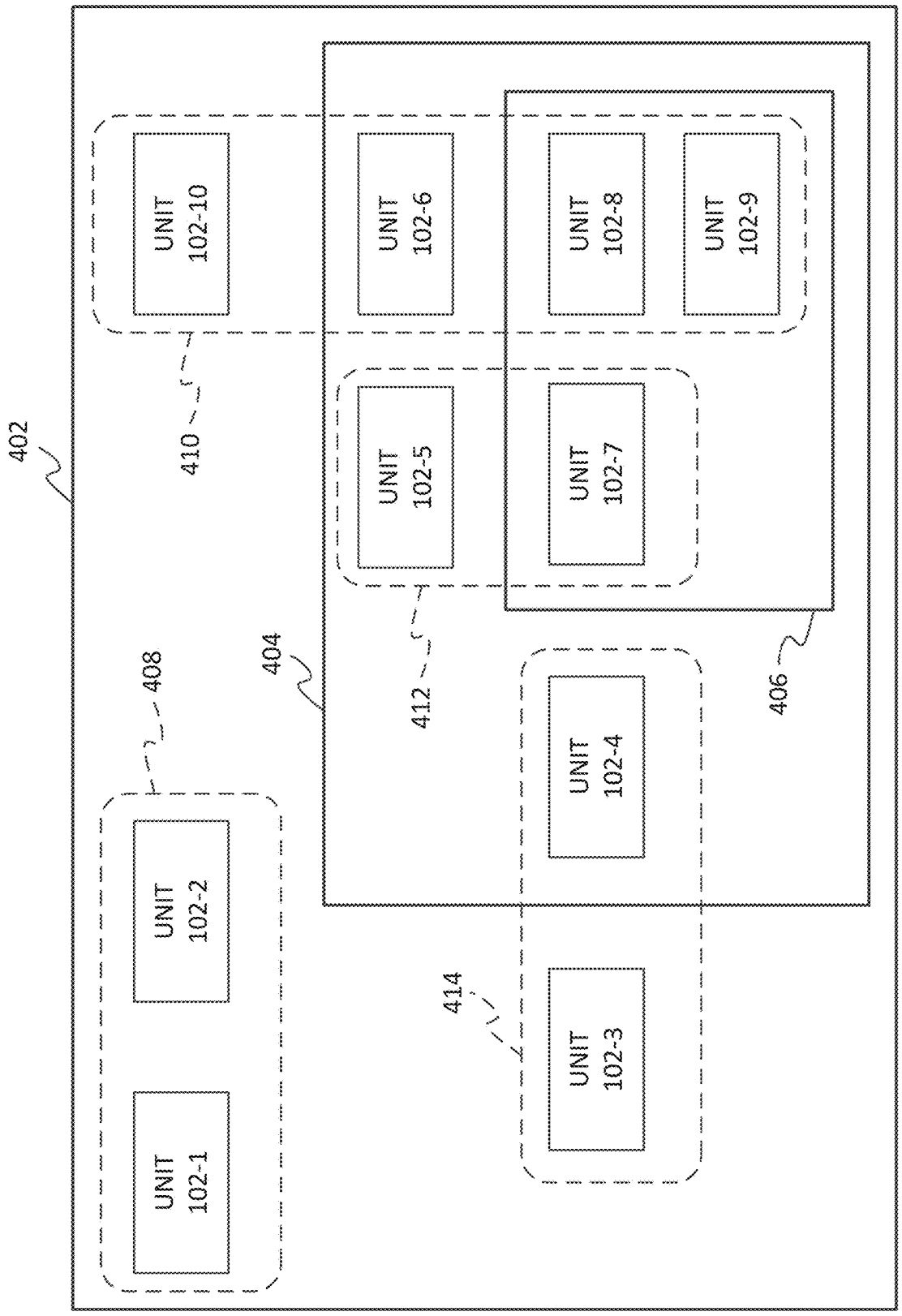
FIG. 4 is a block diagram illustrating an exemplary grouping of MINLP units across sub-flowsheet boundaries.

FIG. 4 illustrates an exemplary grouping of MINLP units 102 across sub-flow sheet boundaries. In an embodiment, a ROMEO solver system embodying aspects of the invention allows for aggregation of a model comprised of MINLP units in sub-flowsheets. A main flowsheet 402 includes a sub-flowsheet 404 which further includes a sub-sub-flowsheet 406. In an embodiment, sub-flowsheets are solved in isolation of other sub-flowsheets. MINLP units 102-1, 102-2, 102-3 and 102-10 are members of main flowsheet 402. MINLP units 102-4, 102-5, and 102-6 are members of sub-flowsheet 404 and MINLP units 102-7, 102-8, and 102-9 are members of sub-sub-flowsheet 406. Aspects of the invention permit specification of the behavior of grouping of MINLP units 102 across sub-flowsheet boundaries. In the embodiment illustrated by FIG. 4, MINLP units 102-1 and 102-2 comprise a group 408, MINLP units 102-6, 102-8, 102-9, and 102-10 comprise a group 410, MINLP units 102-5 and 102-7 comprise a group 412, and MINLP units 102-3 and 102-4 comprise a group 414. The group 410 straddles the boundaries between main flowsheet 402 and sub-flowsheet 404 as well as the boundary between sub-flowsheet 404 and sub-sub-flowsheet 406. The group 412 straddles the boundary between sub-flowsheet 404 and sub-sub-flowsheet 406. The group 414 straddles the boundary between main flowsheet 402 and sub-flowsheet 404. The group 408 does not straddle a boundary because both of its comprising MINLP units 102-1 and 102-2 are members of main flowsheet 402.

In an embodiment, all groups 408, 410, 412, and 414 are active in the context of solving a model at the level of main flowsheet 402 because the comprising MINLP units of each group are members of main flowsheet 402 or its sub-flowsheets (i.e., sub-flowsheet 404 and sub-sub-flowsheet 406). When the context for model solution is set to sub-flowsheet 404, then only group 412 is intact because group 408 has no comprising MINLP units that are members of sub-flowsheet 404, and each of groups 410 and 414 have at least one comprising MINLP unit that are not members of sub-flowsheet 404. In other words, groups 410 and 412 are broken across the boundary between main flowsheet 402 and sub-flowsheet 404. Accordingly, when the context for model solution is set to sub-flowsheet 404, the group membership size of group 414 is only one unit (i.e., unit 102-4) because only unit 102-4 is visible in the context of sub-flowsheet 404. Similarly, when the context for model solution is set to sub-flowsheet 404, group 410 is broken and its membership is only three units (i.e., units 102-6, 102-8, 102-9). When the context for solution is set to sub-sub-flowsheet 406, then group 412 is visible with a membership of one unit (i.e., unit 102-7) and group 410 with a membership of two units (i.e., units 102-8 and 102-9).

Referring further to FIG. 4, in an embodiment in which a sub-flowsheet is solved in isolation, the grouping appropriately considers which groups to admit and which groups to ignore. For example, when sub-flowsheet 404 is solved in isolation then only units 102-4, 102-5, and 102-6 are in context. The grouping of groups 410, 412, and 414 is thus modified in size to consider only those units that are in context (e.g., each of groups 410, 412, 414 have a group size of one unit).

Consider a case in which there are B MINLP units 102 on a flow sheet (e.g., main flowsheet 402). Without grouping, the worst-case complexity for branching of the MINLP solver (e.g., solver module 124) is $2^{B+1}-1$ assuming that all MINLP units 102 have only binary switching. Consider now a case in which the B MINLP units 102 are distributed into M groups, where M B. Grouping the MINLP units 102 introduces as many new group variables as there are groups (e.g., M group variables) and as many new equations as there are MINLP units 102 (e.g., B new equations). Upon grouping, the B MINLP units 102, which were binary variables, are now marked as dependent real variables. Thus, the MINLP solver (e.g. solver module 124) only considers the M new grouping variables as binary variables. Thus, with grouping the worst-case complexity for branching of the MINLP solver is now $2^{M+1}-1$ assuming binary variables. Accordingly, a reduction in the theoretical worst-case complexity is possible because M≤B, and the amount of reduction is dependent upon M. For each node of the MINLP branching, the MINLP solver (e.g., solver module 124) solves a new nonlinear programming (NLP) problem and the reduction in complexity results in fewer NLP problems being solved. In an embodiment, solving fewer problems reducing the amount of required computing resources. In the best case, all MINLP units 102 appear in one group which results in a reduction from $2^{B+1}-1$ NLP problems to only three NLP problems.

Figure 5:
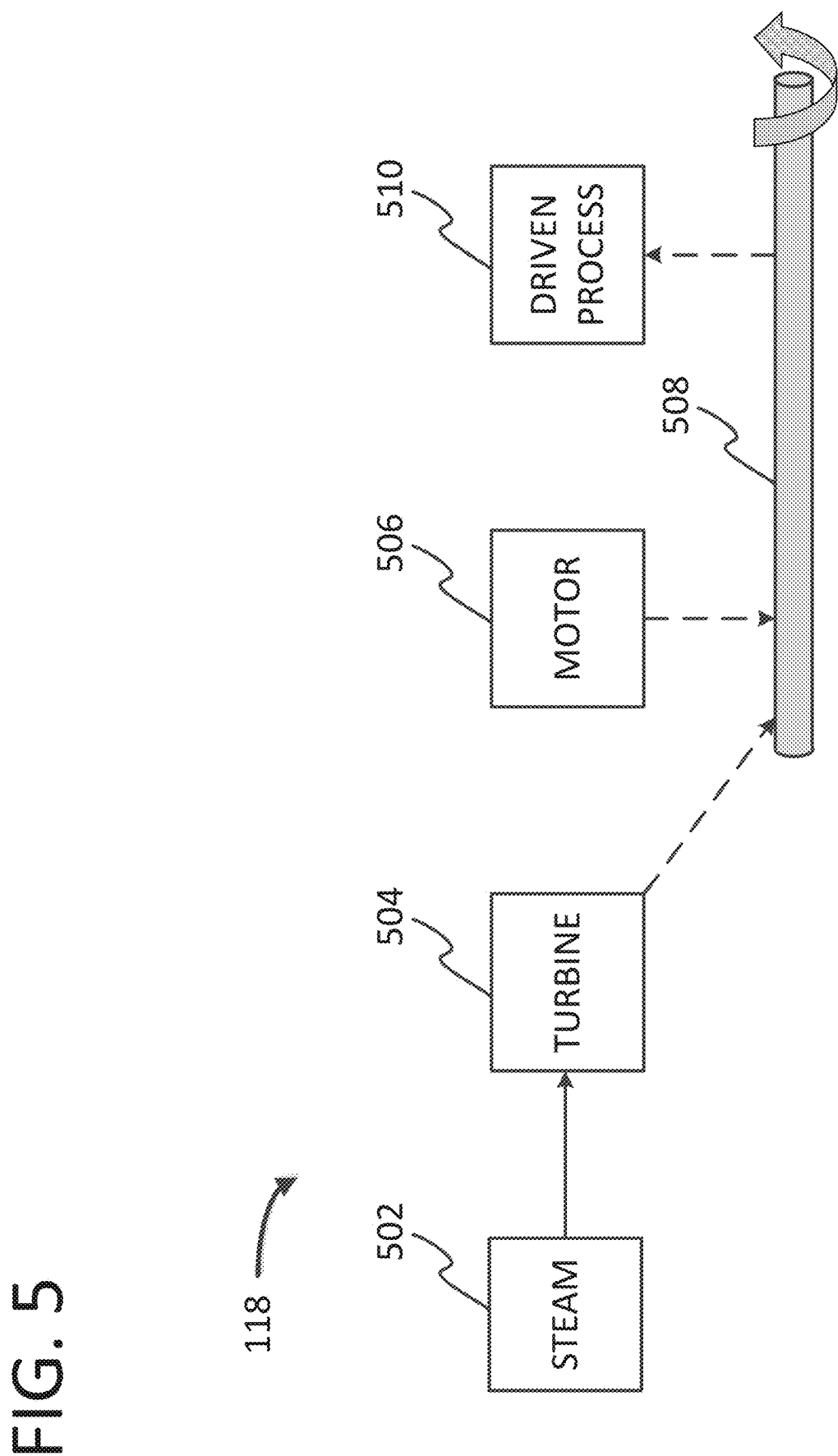
FIGS. 5 and 6 are block diagrams of exemplary continuous processes embodying aspects of the invention.

FIG. 5 illustrates an exemplary process 118 including a steam source 502, a turbine 504, a motor 506, a shaft 508, and a driven process 510. In this embodiment, the turbine 504 and the motor 506 each correspond to an MINLP unit 102 and are in the same group (i.e., have the same group identifier 110-A). Moreover, turbine 504 is marked as a complement of motor 506 (i.e., when motor 506 is on turbine 504 is off, and vice-versa). In this embodiment, a single binary grouping variable, $x_G$, implements the group relationship between turbine 504 and motor 506. Accordingly, two constraining equations are required to relate turbine 504 and motor 506 in the group. Equation 2 represents motor 506 and Equation 3 represents turbine 504:

$$x_{Motor\_MINLPSwitch} - x_G == 0 \quad \text{(Equation 2)}$$

$$x_{Turbine\_MINLPSwitch} - (1-x_G) == 0 \quad \text{(Equation 3)}$$

One having ordinary skill in the art will understand that Equation 3 includes the complementary form of the grouping variable. In an embodiment, $x_G$ is an independent variable and is computed by the ROMEO solving system (e.g., solver module 124). Thus, $x_{Motor\_MINLPSwitch}$ and $x_{Turbine\_MINLPSwitch}$ lose their independent status to become dependent variables and are constrained to behave per the group switching. Accordingly, by using grouping, the load on the MINLP solver (e.g., solver module 124) is reduced from solving two independent variables to solving just one independent variable. In other words, the model representing process 118 can be solved with $x_G$ that can represent the switching operations needed. Table 1 illustrates the status of the variables for the embodiment of FIG. 5.

TABLE 1

| Variable | Before Grouping | After Grouping |
|---|---|---|
| $x_{Motor\_MINLPSwitch}$ | Free-independent | Dependent |
| $x_{Turbine\_MINLPSwitch}$ | Free-independent | Dependent |
| $x_G$ | N/A | Free-independent |

Figure 6:
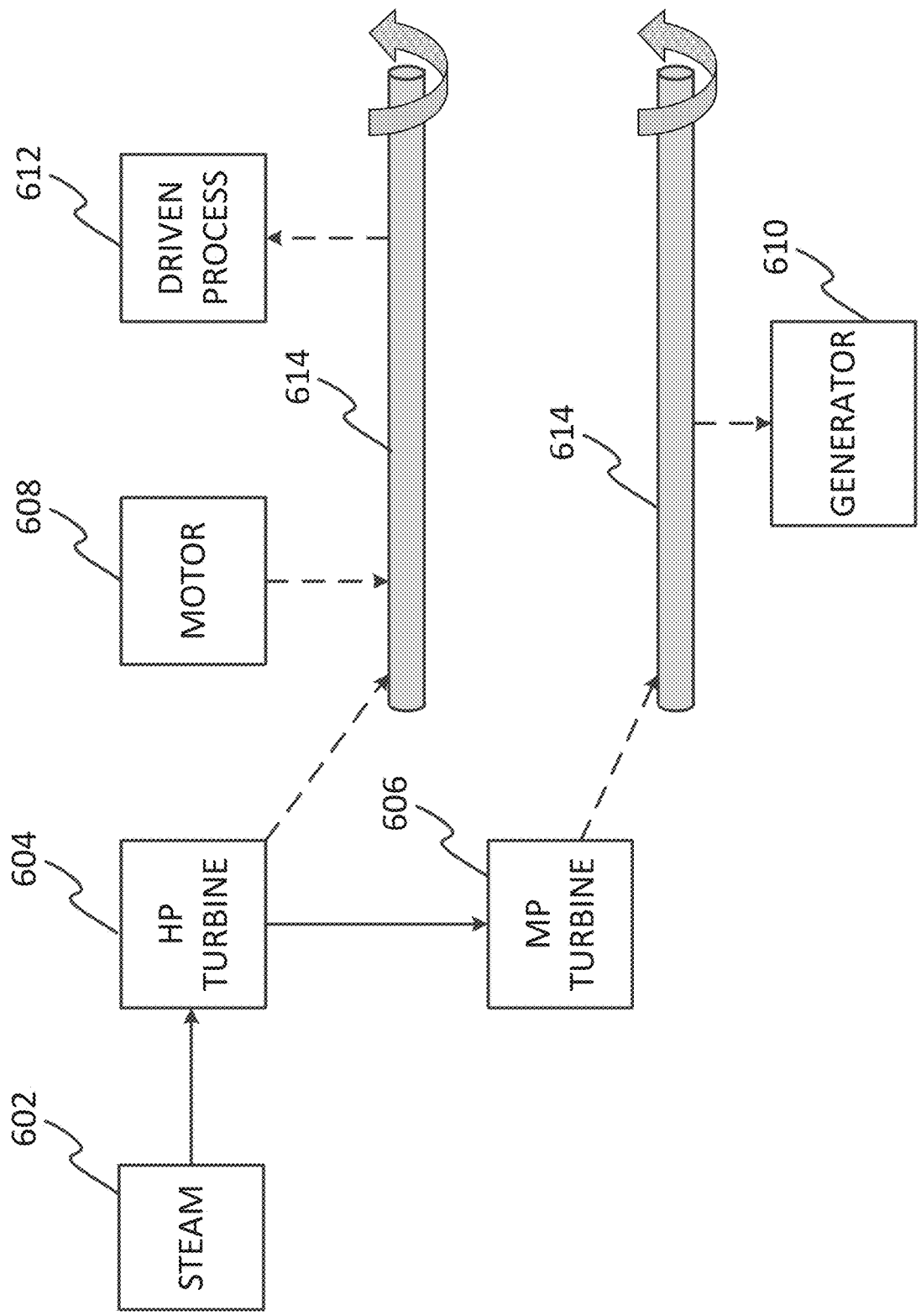

FIG. 6 illustrates another exemplary process 118 including a steam source 602, a first turbine 604, a second turbine 606, a motor 608, a generator 610, a driven process 612, and shafts 614. In this embodiment, the first turbine 604, the second turbine 606, and the motor 608 each correspond to an MINLP unit 102 and are in the same group (i.e., each have the same group identifier 110-A). Moreover, motor 608 is marked as a complement of both first turbine 604 and second turbine 606. In this embodiment, the single binary grouping variable, $x_G$, implements the group relationship between first turbine 604, second turbine 606, and motor 608. Three constraining equations are required to relate the behavior of first turbine 604, second turbine 606, and motor 608 with the grouping variable because the group membership is three units. Equation 4 represents motor 608, Equation 5 represents first turbine 604, and Equation 6 represents second turbine 606:

$$x_{Motor\_MINLPSwitch} - x_G == 0 \quad \text{(Equation 4)}$$

$$x_{FirstTurbine\_MINLPSwitch} - (1-x_G) == 0 \quad \text{(Equation 5)}$$

$$x_{SecondTurbine\_MINLPSwitch} - (1-x_G) == 0 \quad \text{(Equation 6)}$$

One having ordinary skill in the art will understand that Equations 5 and 6 include the complementary form of the grouping variable $x_G$. In an embodiment, $x_G$ is an independent variable, while $x_{Motor\_MINLPSwitch}$, $x_{FirstTurbine\_MINLPSwitch}$, and $x_{SecondTurbine\_MINLPSwitch}$ lose their independent status to become dependent variables and are constrained to behave per the group switching. Accordingly, by using grouping, the load on the MINLP solver (e.g., solver module 124) is reduced from solving three independent variables to solving just one independent variable (e.g., $x_G$). Table 2 illustrates the status of the variables for the embodiment of FIG. 6.

TABLE 2

| Variable | Before Grouping | After Grouping |
|---|---|---|
| $x_{Motor\_MINLPSwitch}$ | Free-independent | Dependent |
| $x_{FirstTurbine\_MINLPSwitch}$ | Free-independent | Dependent |
| $x_{SecondTurbine\_MINLPSwitch}$ | Free-independent | Dependent |
| $x_G$ | N/A | Free-independent |

Figure 7:
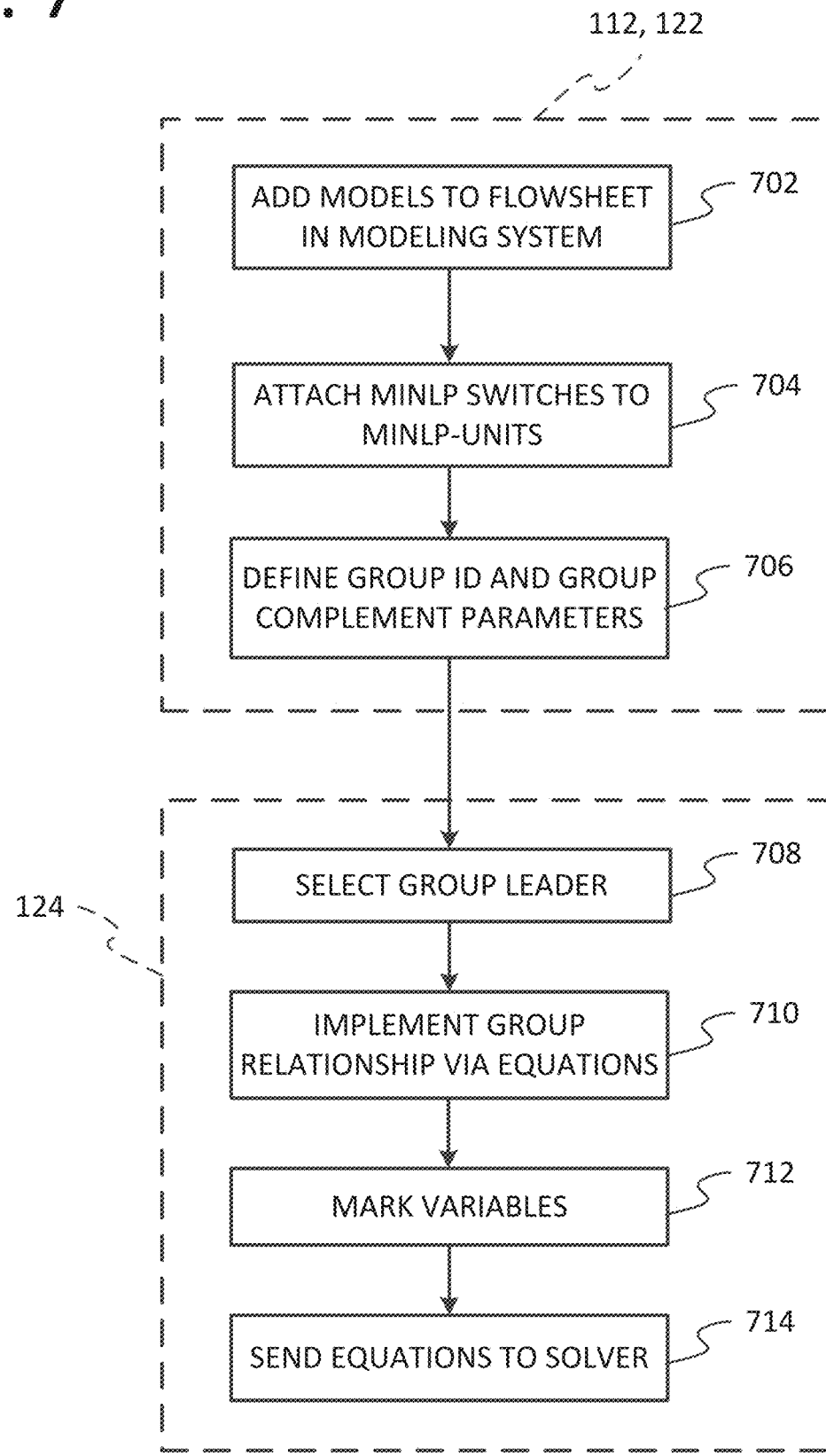
FIGS. 7-10 are flow charts illustrating exemplary workflow processes of grouping MINLP units embodying aspects of the invention.

FIG. 7 illustrates a sample workflow process in a ROMEO-based solver system. At step 702, models are added to a flowsheet of a ROMEO-based modeling system. For example, a user may add models to the flowsheet via process definition interface 122. At step 704, MINLP switches 108 are attached to MINLP units 102, thereby making the units 102 MINLP-active (e.g., MINLP units 102). In an embodiment, a user may attach MINLP switches 108 to MINLP units 102 via process definition interface 122 and/or MINLP interface 112. At step 706, group identifier 110-A and group complement parameter 110-B are defined for each MINLP unit 102. In an exemplary embodiment, a user defines group identifiers 110-A and group complement parameters 110-B via MINLP interface 112. After definition of the parameters, aspects of the invention implement steps 708 through 714 via processor-executable instructions. In an exemplary embodiment, solver module 124 implements steps 708 through 714. At step 708, a group leader is selected for each group. For example, out of all MINLP units 102 that have an identical group identifier 110-A, one of the units is selected as the group leader, which is referred to as $x_G$. By choosing one of the switches as the group leader, instead of introducing a new variable, there is further improvement of efficiency of the solution because there is one less constraint variable to solve. At step 710, group relationships are implemented via equations. In an exemplary embodiment, a new equation is introduced for each MINLP switch 108 (e.g., $x_{MINLPSwitch}$), other than the group leader, for which no equation is required. When group complement parameter 110-B is marked, Equation 7 is introduced.

$$x_{MINLPSwitch} - (1 - x_G) = 0 \quad \text{(Equation 7)}$$

When group complement parameter 110- is unmarked, Equation 8 is introduced.

$$x_{MINLPSwitch} - x_G = 0 \quad \text{(Equation 8)}$$

Continuing operation of the process illustrated at FIG. 7, the variables $x_{MINLPSwitch}$ and $x_G$ are marked at step 712. In an embodiment, $x_{MINLPSwitch}$ is marked as a real dependent variable and $x_G$ is marked as a free-independent binary variable. In an embodiment, $x_G$ may also be referred to as $x_{Group}$. At step 714, Equations 7 and 8 are sent to the solver (e.g., solver module 124).

Figure 8:
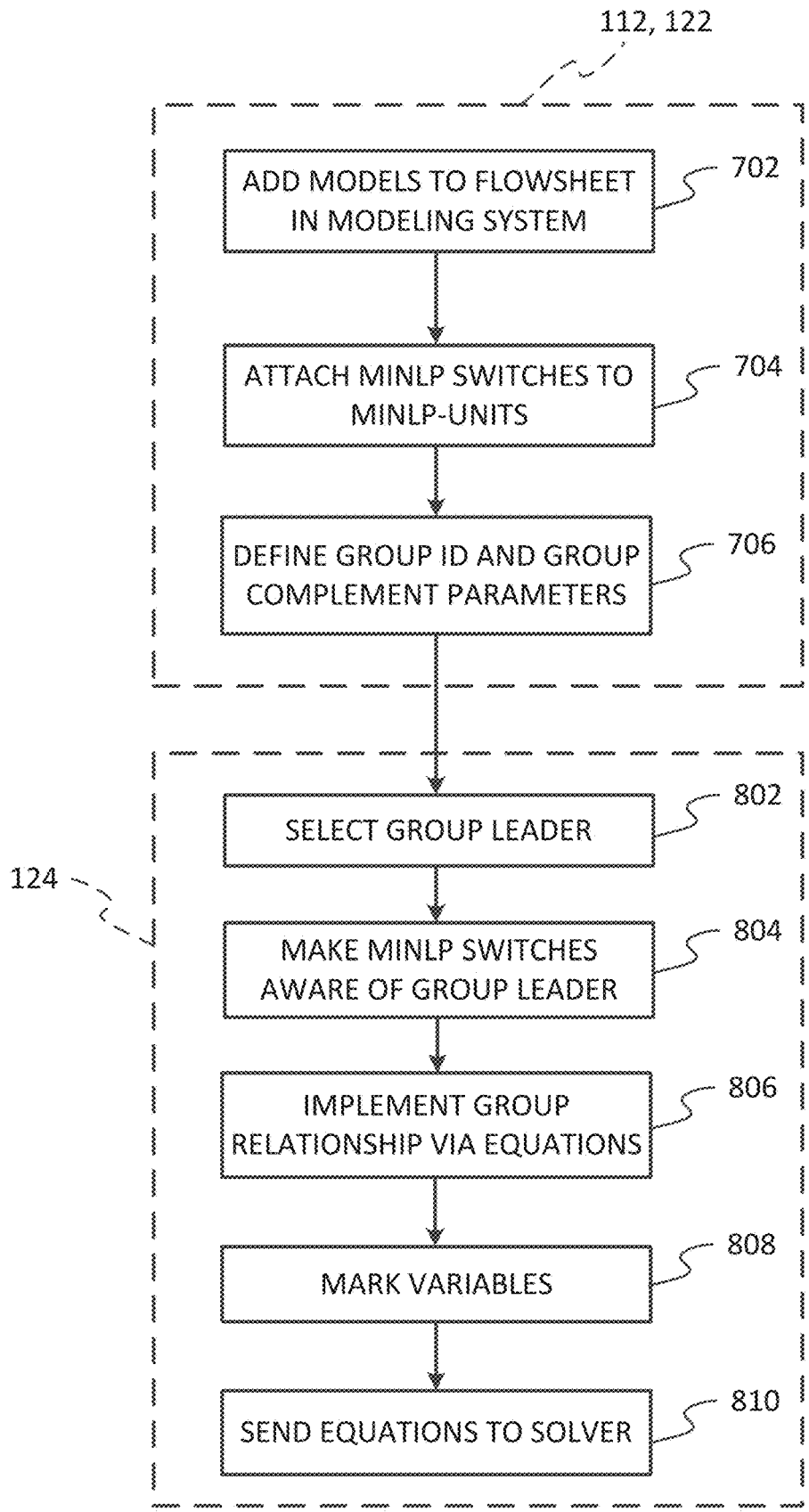

FIG. 8 illustrates another sample workflow process in a ROMEO-based solver system. Aspects of the invention introduce as many new group variables as there are groups, and as many new equations as there are MINLP units 102, in order to encode the grouping constraints. An advantage of this approach is a clean separation of the model variables and the constraint equation variables, in addition to the theoretical reduction in worst-case branching complexity. Aspects of the invention provide further advantages, including reducing the overall computing complexity, by not introducing new grouping variables but instead implicitly handling them. In the process illustrated by FIG. 8, steps 702, 704, and 706 are performed as described above. After definition of the parameters at step 706, aspects of the invention implement steps 802 through 810 via processor-executable instructions. In an exemplary embodiment, solver module 124 implements steps 802 through 810. At step 802, a group leader is selected whose MINLP switch variable will be used as a group variable for all of the MINLP units 102 in the group. In an embodiment, the group leader is referred to as $x_{Group}$. In accordance with another embodiment, each MINLP switch variable already knows the group to which it belongs as well as the group complement that it should present. At step 804, each MINLP switch 108 is made aware of its group leader (e.g., the group leader selected at step 802). At step 806, each MINLP unit 102 implements the group relationship via equations. In an embodiment, for each MINLP switch, $x_{MINLPSwitch}$, if the current switch is the group leader then no changes are made to the existing logic. But if the current switch is not the group leader, then an equation is added to the current switch that implements either Equation 9 if the current switch is not complementary with respect to the group leader (e.g. complement parameter 110-B unmarked) or Equation 10 if the current switch is complementary with respect to the group leader (e.g. complement parameter 110-B marked):

$$x_{MINLPSwitch} - x_{Group} = 0 \quad \text{(Equation 9)}$$

$$x_{MINLPSwitch} - (1 - x_{Group}) = 0 \quad \text{(Equation 10)}$$

At step 808, the variables are marked. For example, the variable $x_{MINLPSwitch}$ is marked as a real dependent variable and the grouping variable $x_{Group}$ is marked as a free-independent binary variable. The equations are sent to the solver (e.g., solver module 124) at step 810. By reusing the existing variables, the embodiment illustrated by FIG. 8 has reduced the problem size from N+S+B+M variables to N+S+B variables, where N is the number of variables in the x vector, S is the number of variables in the y vector, B is the number of MINLP units 102 on the flowsheet, and M is the number groups (e.g., grouping variables), as further described herein. Moreover, the number of constraining equations is reduced to N+B−M because the MINLP unit 102 that is the group leader does not introduce a new equation and there are M group leaders. In an embodiment of the invention corresponding to FIG. 8, the worst-case branching complexity is represented as $2^{M+1}-1$, which makes it amenable to quicker overall solutions that require fewer computing resources than conventional solutions.

Figure 9:
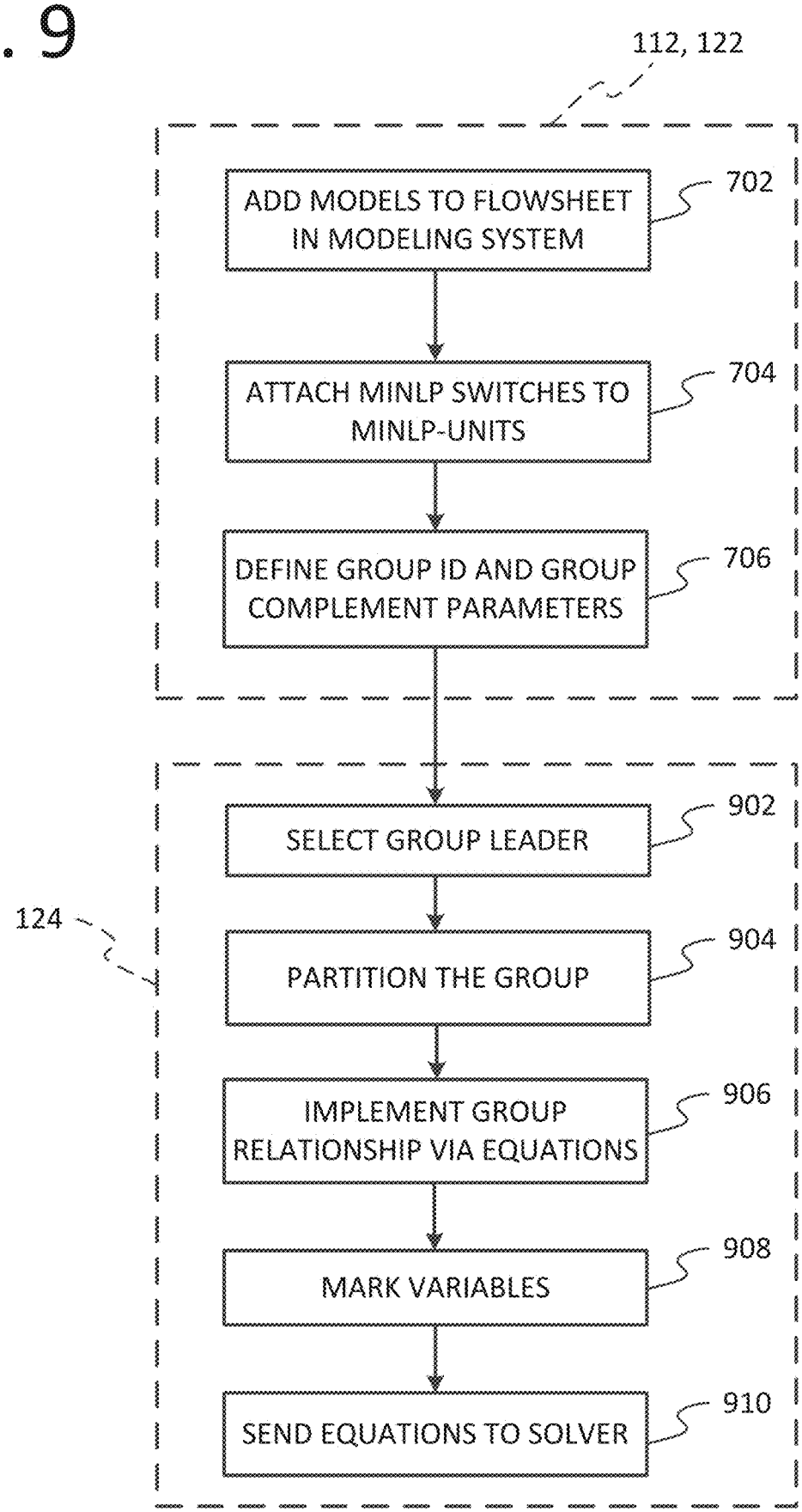

FIG. 9 illustrates yet another sample workflow process in a ROMEO-based solver system. In an embodiment in which each of the MINLP switch variables are restricted to positive numbers, Equation 11 provides yet another implementation for grouping MINLP units.

$$\Sigma_{i=2}^{\text{Size of No-Complement Group}} (x_{MINLPSwitch,i} - x_{Group}) + \Sigma_{j=1}^{\text{Size of Complement Group}} (x_{MINLPSwitch,j} - (1 - x_{Group})) = 0 \quad \text{(Equation 11)}$$

Equation 11 is utilized when, within a group, there are two sets with like-complement variables (e.g., complement parameter 110-B). Moreover, i=1 indicates the group leader. In an embodiment, Equation 11 occurs in the MINLP switch unit of the group leader, which has access to all the members of its groups and their complements. Equation 11 is included in the MINLP switch unit of every group leader. This embodiment reduces the number of equations from N+B−M (e.g., as in the embodiment of FIG. 8) to N+M.

In the embodiment of FIG. 9, the process begins with steps 702, 704, and 706, which are performed as described above. After definition of the parameters at step 706, aspects of the invention implement steps 902 through 910 via processor-executable instructions. In an exemplary embodiment, solver module 124 implements steps 902 through 910. At step 902, a group leader is selected whose MINLP switch variable will be used as a group variable for all of the MINLP units 102 in the group. In an embodiment, the group leader is referred to as $x_{Group}$. At step 904, the group is partitioned into two sets based on the group complement parameter 110-B of the group members. At step 906, Equation 11 is introduced for each group using the partitions i and j where the group leader belongs to partition i and is the first element in that set. In an embodiment, partition i comprises the set of MINLP units 102 having their corresponding group complement parameters 110-B unmarked and partition j comprises the set of MINLP units 102 having their corresponding group complement parameters 110-B marked. At step 908, the variables are marked. For example, the variable $x_{MINLPSwitch}$ is marked as a real dependent variable and the grouping variable $x_{Group}$ is marked as a free-independent binary variable. The equations are sent to the solver (e.g., solver module 124) at step 910.

Figure 10:
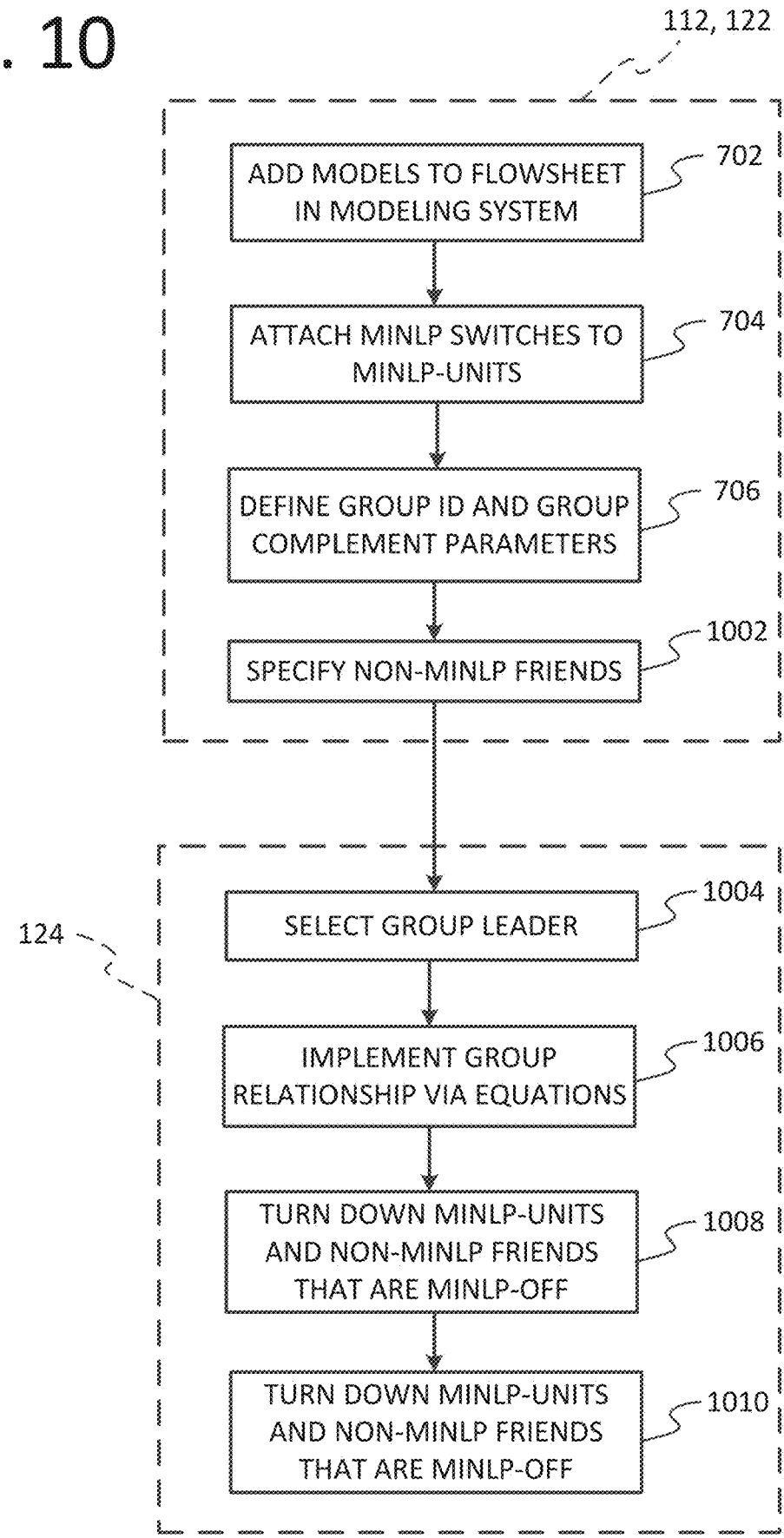

FIG. 10 illustrates a sample workflow process in a ROMEO-based solver system in which generalized grouping enables grouping of non-MINLP units with MINLP units. Consider a case where upon the switching off of an MINLP unit 102, subsequent actions need to take place at a non-MINLP unit dependent upon this switched off MINLP unit. Failure to incorporate the subsequent actions at the non-MINLP unit may cause the system to behave non-robustly in terms of numerical behavior with the chance of solver (e.g., solver module 124) failure. For example, a continuous process or plant (e.g., process 118) may include a first compressor driven by a steam turbine and a second compressor driven by an electric motor. In an embodiment, unit models 102 that represent the first compressor and the second compressor are each MINLP-aware because each compressor is a consumer of a resource (e.g., steam and electricity, respectively) that has an associated monetary value. In the process 118, the second compressor is only used when throughput is high and the first compressor is fully loaded. Moreover, each compressor includes associated safety controls that maintain a minimum flow through each compressor. In the event that MINLP optimization (e.g., solver module 124) decides to turn down (e.g., turn off) the electric motor (e.g., in response to a fall in throughput and adjustment to a new operating point), then some actions associated with non-MINLP units may need to be performed in order to maintain robust behavior of the system. A generalization of the grouping construct provided by aspects of the invention provides a solution to facilitate such coordination between MINLP units in a group and non-MINLP units.

Generalization of the grouping construct provides the ability to associate non-MINLP units with a group of MINLP units such that the non-MINLP units behave in an identical manner to the group. In an embodiment in which the group is MINLP-off some actions that assist convergence and prevent inconsistent behavior should occur in the non-MINLP units. In another embodiment, the solver module 124 (e.g., a ROMEO solver system) provides the ability to turn down sections of flowsheets prior to a solver run (e.g., during a setup phase), in which case the equations and variables in the turned down section will not be used in the system of equations by the solver module 124. For example, the turn down operation may happen before a solve operation is initiated, and thus the turn down operation would not be suitable in the context of an MINLP optimization technique that searches various switching configurations. Thus, aspects of the invention may take some actions on those sections that would have an equivalent effect mathematically. In another embodiment, turned down sections are represented by blue highlighting on a user interface (e.g., process definition interface 122).

Referring further to FIG. 10, the process beings with steps 702, 704, and 706, which are performed as described above. After definition of the parameters at step 706, a user specifies for each group the non-MINLP units that are friends of the group at step 1002. For example, a user may specify non-MINLP units through friend parameter 110-C via MINLP GUI 112. In accordance with additional embodiments, the generalized grouping will provide a user interface that can be used to enter the non-MINLP unit friends of a group. After specification of the non-MINLP unit friends at step 1002, aspects of the invention implement steps 1004 through 1010 via processor-executable instructions. In an exemplary embodiment, solver module 124 implements steps 1004 through 1010. At step 1004, a group leader is selected whose MINLP switch variable will be used as a group variable for all of the MINLP units 102 in the group. In an embodiment, the group leader is referred to as $x_{Group}$. At step 1006, each MINLP unit 102 implements the group relationship via equations. For example, the group relationship may be implemented via Equations 7, 8, 9, 10, and/or 11, as described above. Moreover, the non-MINLP friends specified at step 1002 are monitored at step 1006 to ensure behavior consistent with the group. For example, consistent behavior may be provided by use of the group variable $x_{Group}$, as further described herein, in a multiplicative and/or complementary manner. In other words, aspects of the invention introduce mechanisms into the non-MINLP unit models that enable numerically stable switching off of these non-MINLP units that are friends of the group. At the end of an MINLP run, the MINLP units 102 that are switched off will also have their non-MINLP friend units turned off or turned on implicitly.

Continuing the process illustrated by FIG. 10 at step 1008, prior to a subsequent data reconciliation run, units that are MINLP-off are turned down, which removes them from the equations used by solver module 124. In an embodiment, line-up macros mark non-MINLP friend units as being turned down, if so merited. In accordance with aspects of the invention, line-up macros are utilities embodied in processor-readable instructions to set up the problem to some desired state prior to solution. At step 1010, prior to an MINLP optimization run, another macro will look for MINLP units 102 that are turned down but include an MINLP switch 108 and have their MINLP flag 310 turned on (e.g. checkbox checked, a "UseInMINLP" variable equal to one, etc.). These MINLP units 102 will be turned on, which makes them available for MINLP optimization again. Also at step 1010, a macro of the same class will look for non-MINLP friend units that are turned down and turn them on for MINLP optimization. In an alternative embodiment, the MINLP switches 108 and turned down units continue to remain in the system of equations and the macros are not run prior to a data reconciliation run to turn down the units that are MINLP-off. An exemplary benefit of such an embodiment is that the model is in the correct state at the start of the next MINLP optimization run, which avoids the issues related to initializing the models that are turned on. In this embodiment, the units that are MINLP-off and associated non-MINLP friends remain passively in an off state in the system of equations in solver module 124.

The above discussion included grouping which implemented simple constraints. Logical constraints also provide a powerful mechanism for specifying and/or encoding plant constraints for MINLP units, and one having ordinary skill in the art will understand that logical constraints may be used with any of the previously mentioned embodiments. Logical constraints are composed of logical operations on grouping variables. According to aspects of the invention, logical constraints further reduce the workload for the MILNP solver.

A first type of logical constraint is an arithmetic constraint. An exemplary arithmetic constraint may be specified as "only one of the specified group variables should be ON."

In the general case, "only K of the specified group variables should be ON" where, for the purpose of non-triviality, K is less than the number of the specified group variables. An exemplary constraint that states that just one binary should be ON is $x_{B1}+x_{B2}+x_{B3}=1$. An exemplary general case is given by Equation 55, where 0<K<N for non-triviality, and K is an integer:

$$x_{B1}+x_{B2}+\ldots x_{BN} \leq K \quad \text{(Equation 12)}$$

A second type of logical constraint is a two-group constraint, which provides the ability to implement complex logical relations. For example, if a user wants to encode plant constraints beyond group membership and complements, a two-group constraint may be utilized. In a two-group constraint embodiment, logical constraints operate on two group variables at a time, encoding a logical operation between them. For example, the common logical operations "AND" and "OR" are available. One having ordinary skill in the art will understand that two-group "XOR" and "NOT" logical operations are already covered by the grouping constraints. For example, if two groups had an XOR relationship, then the two could be merged into one single group with one group flipping in its existing complement upon merging. In an embodiment, a user can manually merge groups between which an XOR relationship is desired. An exemplary syntax of a two-group constraint is "Group_var1 LOGICAL_OPERATOR Group_var2". In an embodiment, a two-group constraint is meaningful at the group level and is not meaningful at the unit level. In another embodiment, a two-group constraint is available via an MINLP Manager configuration window, as further described herein. In an embodiment, simple constraints involve two group variables as represented by Equations 13 and 14:

$$OR(x_{G1},x_{G2}): x_{G1}+x_{G2}-x_{G1}x_{G2}-1==0 \quad \text{(Equation 13)}$$

$$AND(x_{G1},x_{G2}): x_{G1}x_{G2}-1==0 \quad \text{(Equation 14)}$$

Each logical constraint (OR and AND) has two group variables that were initially free-independent, but one group variable becomes dependent when the new equation is added. Thus, if there are G MINLP group variables, where G is an even number, then there can be at most G simple logical constraints of the two-group type, at which point there will be no more free independent MINLP variables for the optimizer to work upon. In an exemplary embodiment of the two-group constraint type, information such as "Group1 OR Group2" which must be TRUE, is encoded. In other words, either Group 1 or Group2, or both, should be on (i.e., active) at a solution. This condition can be useful if there are a number of groups in the plant and the user wants either or both important groups to be on at the solution.

A third type of logical constraints are two-group, three-operator constraints. An exemplary syntax of this third type is "Operator(Group Variable 1) LOGICAL_OPERATOR Operator(Group Variable 2)" where "Operator" is restricted to "NOT" or no-operator and "LOGICAL_OPERATOR" may be "OR" or "AND". Implementation of this syntax is exactly similar to Equations 13 and 14, except that when a group variable is in a NOT operator, it should appear in the equations as a complement (i.e., $(1-x_G)$). An exemplary embodiment is "NOT($x_{G1}$) OR $x_{G2}$" which means $x_{G1}$ should not operate by itself. Table 3 provides a truth table format for this exemplary embodiment.

TABLE 3

| $x_{G1}$ | NOT($x_{G1}$) | $x_{G2}$ | NOT($x_{G1}$) OR $x_{G2}$ |
|---|---|---|---|
| 0 | 1 | 0 | 1 |
| 0 | 1 | 1 | 1 |
| 1 | 0 | 0 | 0 |
| 1 | 0 | 1 | 1 |

Another exemplary embodiment is "NOT($x_{G1}$) OR NOT($x_{G2}$)" which means $x_{G1}$ and $x_{G2}$ both cannot operate together. Table 4 provides a truth table format for this exemplary embodiment.

TABLE 4

| $x_{G1}$ | NOT($x_{G1}$) | $x_{G2}$ | NOT($x_{G2}$) | NOT($x_{G1}$) OR NOT($x_{G2}$) |
|---|---|---|---|---|
| 0 | 1 | 0 | 1 | 1 |
| 0 | 1 | 1 | 0 | 1 |
| 1 | 0 | 0 | 1 | 1 |
| 1 | 0 | 1 | 0 | 0 |

Yet another exemplary embodiment is "NOT($x_{G1}$) AND $x_{G2}$" which means when $x_{G2}$ is on, $x_{G1}$ should be off. Table 5 provides a truth table format for this exemplary embodiment.

TABLE 5

| $x_{G1}$ | NOT($x_{G1}$) | $x_{G2}$ | NOT($x_{G1}$) AND $x_{G2}$ |
|---|---|---|---|
| 0 | 1 | 0 | 0 |
| 0 | 1 | 1 | 1 |
| 1 | 0 | 0 | 0 |
| 1 | 0 | 1 | 0 |

Another exemplary embodiment is "NOT($x_{G1}$) AND NOT($x_{G2}$)" which means both $x_{G1}$ and $x_{G2}$ should be turned off. Table 6 provides a truth table format for this exemplary embodiment.

TABLE 6

| $x_{G1}$ | NOT($x_{G1}$) | $x_{G2}$ | NOT($x_{G2}$) | NOT($x_{G1}$) AND NOT($x_{G2}$) |
|---|---|---|---|---|
| 0 | 1 | 0 | 1 | 1 |
| 0 | 1 | 1 | 0 | 0 |
| 1 | 0 | 0 | 1 | 0 |
| 1 | 0 | 1 | 0 | 0 |

A fourth type of logical constraint is a three-group constraint with four operators (i.e., three-group four-operator). In an embodiment, three-group four-operator constraints offer the ability to encode complex plant constraints. In an embodiment, the logical operators "AND" and "OR" may be encoded and each group variable may be processed with a "NOT" logical operator. An exemplary syntax of this fourth type is "Group variable 1 LOGICAL_OPERATOR Group variable 2 IF Group variable 3". An exemplary embodiment is "$x_{G1}$ OR $x_{G2}$ IF NOT($x_{G3}$)" which means either or both of $x_{G1}$ and $x_{G2}$ is on if $x_{G3}$ is off and if $x_{G3}$ is on then $x_{G1}$ and $x_{G2}$ are "don't care". This embodiment may also be implemented as Equation 15.

$$OR(x_{G1},x_{G2}) \ IF \ NOT(x_{G3}): (x_{G1}+x_{G2}-x_{G1}x_{G2})(1-x_{G3})-1+x_{G3}==0 \quad \text{(Equation 15)}$$

Aspects of the invention provide grouping to cluster MINLP units that switch similarly or complementarily in unison in a set. Further aspects of the invention implement grouping via equations as described herein. In accordance with an embodiment of the invention, the theoretical worst-case complexity is reduced and solutions are computed more quickly by using the grouping variables as MINLP solver variables. Additional aspects of the invention provide a reduction in overall size complexity of MINLP optimization by implementing grouping via equations as described herein. Aspects of the invention also provide generalized grouping as a means to include non-MINLP units (i.e., friends) of groups to enable some operations on the non-MINLP units in response to switching behavior of the group. Further aspects of the invention provide logical constraints as a means to encode complex plant constraints.

Embodiments of the present invention may comprise a special purpose computer including a variety of computer hardware, as described in greater detail below.

Embodiments within the scope of the present invention also include computer-readable media for carrying or having computer-executable instructions or data structures stored thereon. Such computer-readable media can be any available media that can be accessed by a special purpose computer. By way of example, and not limitation, such computer-readable media can comprise RAM, ROM, EEPROM, CD-ROM or other optical disk storage, magnetic disk storage, or other magnetic storage devices, or any other medium that can be used to carry or store desired program code means in the form of computer-executable instructions or data structures and that can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

The following discussion is intended to provide a brief, general description of a suitable computing environment in which aspects of the invention may be implemented. Although not required, aspects of the invention will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represent examples of corresponding acts for implementing the functions described in such steps.

Those skilled in the art will appreciate that aspects of the invention may be practiced in network computing environments with many types of computer system configurations, including personal computers, hand-held devices, multi-processor systems, microprocessor-based or programmable consumer electronics, network PCs, minicomputers, mainframe computers, and the like. Aspects of the invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing aspects of the invention includes a special purpose computing device in the form of a conventional computer, including a processing unit, a system memory, and a system bus that couples various system components including the system memory to the processing unit. The system bus may be any of several types of bus structures including a memory bus or memory controller, a peripheral bus, and a local bus using any of a variety of bus architectures. The system memory includes read only memory (ROM) and random access memory (RAM). A basic input/output system (BIOS), containing the basic routines that help transfer information between elements within the computer, such as during start-up, may be stored in ROM. Further, the computer may include any device (e.g., computer, laptop, tablet, PDA, cell phone, mobile phone, a smart television, and the like) that is capable of receiving or transmitting an IP address wirelessly to or from the internet.

The computer may also include a magnetic hard disk drive for reading from and writing to a magnetic hard disk, a magnetic disk drive for reading from or writing to a removable magnetic disk, and an optical disk drive for reading from or writing to removable optical disk such as a CD-ROM or other optical media. The magnetic hard disk drive, magnetic disk drive, and optical disk drive are connected to the system bus by a hard disk drive interface, a magnetic disk drive-interface, and an optical drive interface, respectively. The drives and their associated computer-readable media provide nonvolatile storage of computer-executable instructions, data structures, program modules, and other data for the computer. Although the exemplary environment described herein employs a magnetic hard disk, a removable magnetic disk, and a removable optical disk, other types of computer readable media for storing data can be used, including magnetic cassettes, flash memory cards, digital video disks, Bernoulli cartridges, RAMs, ROMs, solid state drives (SSDs), and the like.

The computer typically includes a variety of computer readable media. Computer readable media can be any available media that can be accessed by the computer and includes both volatile and nonvolatile media, removable and non-removable media. By way of example, and not limitation, computer readable media may comprise computer storage media and communication media. Computer storage media include both volatile and nonvolatile, removable and non-removable media implemented in any method or technology for storage of information such as computer readable instructions, data structures, program modules or other data. Computer storage media are non-transitory and include, but are not limited to, RAM, ROM, EEPROM, flash memory or other memory technology, CD-ROM, digital versatile disks (DVD) or other optical disk storage, SSDs, magnetic cassettes, magnetic tape, magnetic disk storage or other magnetic storage devices, or any other medium which can be used to store the desired non-transitory information, which can accessed by the computer. Alternatively, communication media typically embody computer readable instructions, data structures, program modules or other data in a modulated data signal such as a carrier wave or other transport mechanism and includes any information delivery media.

Program code means comprising one or more program modules may be stored on the hard disk, magnetic disk, optical disk, ROM, and/or RAM, including an operating system, one or more application programs, other program modules, and program data. A user may enter commands and information into the computer through a keyboard, pointing device, or other input device, such as a microphone, joy stick, game pad, satellite dish, scanner, or the like. These and other input devices are often connected to the processing unit through a serial port interface coupled to the system bus. Alternatively, the input devices may be connected by other interfaces, such as a parallel port, a game port, or a universal serial bus (USB). A monitor or another display device is also connected to the system bus via an interface, such as a video adapter. In addition to the monitor, personal computers typically include other peripheral output devices (not shown), such as speakers and printers.

One or more aspects of the invention may be embodied in computer-executable instructions (i.e., software), routines, or functions stored in system memory or non-volatile memory as application programs, program modules, and/or program data. The software may alternatively be stored remotely, such as on a remote computer with remote application programs. Generally, program modules include routines, programs, objects, components, data structures, etc. that perform particular tasks or implement particular abstract data types when executed by a processor in a computer or other device. The computer executable instructions may be stored on one or more tangible, non-transitory computer readable media (e.g., hard disk, optical disk, removable storage media, solid state memory, RAM, etc.) and executed by one or more processors or other devices. As will be appreciated by one of skill in the art, the functionality of the program modules may be combined or distributed as desired in various embodiments. In addition, the functionality may be embodied in whole or in part in firmware or hardware equivalents such as integrated circuits, application specific integrated circuits, field programmable gate arrays (FPGA), and the like.

The computer may operate in a networked environment using logical connections to one or more remote computers. The remote computers may each be another personal computer, a tablet, a PDA, a server, a router, a network PC, a peer device, or other common network node, and typically include many or all of the elements described above relative to the computer. The logical connections include a local area network (LAN) and a wide area network (WAN) that are presented here by way of example and not limitation. Such networking environments are commonplace in office-wide or enterprise-wide computer networks, intranets and the Internet.

When used in a LAN networking environment, the computer is connected to the local network through a network interface or adapter. When used in a WAN networking environment, the computer may include a modem, a wireless link, or other means for establishing communications over the wide area network, such as the Internet. The modem, which may be internal or external, is connected to the system bus via the serial port interface. In a networked environment, program modules depicted relative to the computer, or portions thereof, may be stored in the remote memory storage device. It will be appreciated that the network connections shown are exemplary and other means of establishing communications over wide area network may be used.

Preferably, computer-executable instructions are stored in a memory, such as the hard disk drive, and executed by the computer. Advantageously, the computer processor has the capability to perform all operations (e.g., execute computer-executable instructions) in real-time.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

Embodiments of the invention may be implemented with computer-executable instructions. The computer-executable instructions may be organized into one or more computer-executable components or modules. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

When introducing elements of aspects of the invention or the embodiments thereof, the articles "a", "an", "the" and "said" are intended to mean that there are one or more of the elements. The terms "comprising", "including", and "having" are intended to be inclusive and mean that there may be additional elements other than the listed elements.

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

What is claimed is:

1. A system, comprising:
one or more computers comprising one or more processors and one or more non-transitory computer readable media, the one or more non-transitory computer readable media comprising instructions stored thereon that when executed cause the one or more computers to:
generate, by the one or more processors, a plurality of model components implementing at least one first-principle equation, wherein the at least one first-principle equation represents at least one process unit, and wherein two or more of the plurality of model components comprise a group;
generate, by the one or more processors, a plurality of switch components each comprising a corresponding one of the plurality of model components and each implementing a mixed integer nonlinear programming (MINLP) behavior of the corresponding one of the plurality of model components; wherein each switch component includes a group identifier parameter of the group and a group complement parameter encoding an operational constraint; and
generate, by the one or more processors, an MINLP solver component configured to switch each of the plurality of model components of the group between an active state and an inactive state based at least in part on the group identifier parameter and the group complement parameter during a simulation.

2. The system of claim 1, wherein the group identifier parameter comprises a common value among each of the two or more of the plurality of model components comprising the group.

3. The system of claim 1, wherein the plurality of model components each exhibit a complementary switching behavior during the simulation when the group complement parameter is in a marked state.

4. The system of claim 1, wherein each of the plurality of switch components are made aware of a group leader unit model component of the plurality of model components.

5. The system of claim 1, wherein the group comprises a first set of model components each having an unmarked group complement parameter and a second set of model components each having a marked group complement parameter.

6. The system of claim 1, wherein the group comprises at least one model component not comprising one of the plurality of switch components.

7. The system of claim 1, wherein each of the plurality of switch components further includes one or more logical constraints.

8. A method for generating an optimal operating state of a process comprising:
providing one or more computers comprising one or more processors and one or more non-transitory computer readable media, the one or more non-transitory computer readable media including instructions stored thereon that when executed implement steps of:
simulating, by the one or more processors, an operation of a plurality of unit models in conjunction with a mixed integer nonlinear programming (MINLP) solver, the plurality of unit models each representing one of a plurality of process units via at least one first-principle equation;
grouping, by the one or more processors, two or more of the plurality of unit models into a group based on at least one operating constraint, each of the plurality of unit models of the group having an MINLP switch implementing MINLP behavior, and each MINLP switch encoding the at least one operating constraint;
switching, by the one or more processors, the MINLP switch of each of the plurality of unit models of the group between an active state and an inactive state during said simulating based at least in part on the at least one operating constraint; and
generating, by the one or more processors, an operating state of a process based on said simulating, said grouping, and said switching, wherein the operating state satisfies the at least one operating constraint.

9. The method of claim 8, wherein each MINLP switch encodes the at least one operating constraint as a group identifier parameter; and
wherein the instructions further comprise a step of assigning a common value to the group identifier parameter of each unit model of the group.

10. The method of claim 9, wherein each MINLP switch further encodes the at least one operating constraint as a group complement parameter, and wherein the instructions further comprise a step of assigning at least one of a marked state and an unmarked state to each group complement parameter, wherein a unit model exhibits complementary switching behavior with respect to other unit models of the group when the group complement parameter of the unit model is in a marked state, and wherein a unit model exhibits similar switching behavior with respect to other unit models of the group when the group complement parameter of the unit model is in an unmarked state.

11. The method of claim 8, wherein said grouping comprises making each of the plurality of unit models of the group implicitly aware of a group leader unit model.

12. The method of claim 8, wherein said grouping comprises partitioning each of the plurality of unit models of the group into a first set of non-complementary unit models and a second set of complementary unit models.

13. The method of claim 8, wherein the instructions further comprise a step of associating the plurality of unit models of the group with at least one unit model not having the MINLP switch.

14. The method of claim 8, wherein each MINLP switch encodes the at least one operating constraint as a logical constraint.

15. A system comprising:
one or more non-transitory computer readable media, the one or more non-transitory computer readable media including instructions stored thereon that when executed are configured to cause one or more computers to:
generate, by one or more processors, a plurality of model modules each defining a plurality of unit models, each unit model representing a process unit within a process via at least one first-principle equation during an execution of the plurality of model modules by the one or more processors, wherein two or more of the plurality of model modules comprise a group;
generate, by one or more processors, a plurality of mixed integer nonlinear programming (MINLP) switch modules each transitioning a corresponding model module of the group between an active state and an inactive state based at least in part on a parameter encoding at least one operating constraint, the plurality of MINLP switch modules each implementing an MINLP behavior of the corresponding model module; and
generate, by one or more processors, a solver module simulating an operation of each of the plurality of model modules and each of the plurality of MINLP switch modules during an execution of the solver module to generate an operating state of a process, wherein the operating state satisfies the parameter encoding the at least one operating constraint.

16. The system of claim 15, wherein the parameter comprises a group identifier parameter; and
wherein a common value is assigned to the group identifier parameter of the plurality of model modules of the group.

17. The system of claim 16, wherein the parameter further comprises a group complement parameter; and
wherein a model module exhibits complementary transitioning behavior with respect to other model modules of the group during the execution when the group complement parameter of the model module is in a marked state.

18. The system of claim 15,
wherein each of the plurality of model modules of the group are made aware of a group leader model module.

19. The system of claim 15,
wherein the group comprises a first set of non-complementary model modules and a second set of complementary model modules.

20. The system of claim 15,
wherein the parameter comprises one or more logical constraints encoding the at least one operating constraint.

* * * * *